US007869320B2

(12) United States Patent
Raaymakers (10) Patent No.: US 7,869,320 B2
(45) Date of Patent: Jan. 11, 2011

(54) METHOD AND DEVICE FOR PERFORMING TILT CORRECTION USING MULTI-DIMENSIONAL ACTUATOR

(75) Inventor: Jeroen Arnoldus Leonardus Johannes Raaymakers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 960 days.

(21) Appl. No.: 10/509,453

(22) PCT Filed: Apr. 1, 2003

(86) PCT No.: PCT/IB03/01395

§ 371 (c)(1),
(2), (4) Date: Sep. 28, 2004

(87) PCT Pub. No.: WO03/083850

PCT Pub. Date: Oct. 9, 2003

(65) Prior Publication Data

US 2005/0117472 A1 Jun. 2, 2005

(30) Foreign Application Priority Data

Apr. 2, 2002 (EP) .................................. 02076303

(51) Int. Cl.
*G11B 17/32* (2006.01)
*G11B 15/62* (2006.01)
(52) U.S. Cl. .................................. 369/53.19; 369/44.32
(58) Field of Classification Search .................. None
See application file for complete search history.

(56) References Cited

U.S. PATENT DOCUMENTS 5,206,848 A * 4/1993 Kusano et al. .......... 369/44.41

| | | | | |
|---|---|---|---|---|
| 5,602,566 A * | 2/1997 | Motosyuku et al. | ......... | 345/684 |
| 5,627,808 A * | 5/1997 | Hajjar et al. | ............. | 369/44.32 |
| 5,825,740 A * | 10/1998 | Kahlman et al. | ......... | 369/44.27 |
| 6,157,600 A | 12/2000 | Nakamura et al. | | |
| 6,181,670 B1 * | 1/2001 | Nagasato | .................... | 720/681 |
| 6,266,301 B1 * | 7/2001 | Morimoto | ................ | 369/44.23 |
| 6,597,643 B1 * | 7/2003 | Mitchell et al. | .......... | 369/44.27 |
| 6,714,496 B2 * | 3/2004 | Park et al. | ................ | 369/53.19 |
| 6,845,068 B2 * | 1/2005 | Watanabe | ................ | 369/44.34 |
| 6,876,614 B2 * | 4/2005 | Raaymakers | ............. | 369/53.19 |

(Continued)

FOREIGN PATENT DOCUMENTS

JP 03137831 A 6/1991

(Continued)

*Primary Examiner*—Joseph H Feild
*Assistant Examiner*—Parul Gupta (57) ABSTRACT

In a method and device for performing tilt control, a focus and a tilt controlling output is generated, and a focusing and tilt state of an optical recording/reproducing beam is controlled by determining a radial tilt value based on a differentiation of focus control values obtained at different radii of said optical disk (1). The combination of, e.g., a 3D actuator with the dz/dr tilt measurement provides the advantage that focus and tilt adjustment can be performed in the same element. Thereby, influences or measurement variations caused by environmental conditions and/or circuit characteristics can be minimized to reduce compensations requirements. Furthermore, a 3D actuator (11) with a split coil arrangement may be used to provide a three-dimensional focus adjustment. Thereby, the 3D actuator (11) can be used for feed-forward tilt compensation without offset or gain errors and without any additional sensor.

13 Claims, 4 Drawing Sheets

U.S. PATENT DOCUMENTS

| | | | |
|---|---|---|---|
| 7,054,241 B2 * | 5/2006 | Kondo et al. | 369/44.32 |
| 2001/0021164 A1 | 9/2001 | Fujii et al. | |

FOREIGN PATENT DOCUMENTS

| | | |
|---|---|---|
| JP | 101777729 A | 6/1998 |
| JP | 10261233 A | 9/1998 |
| JP | 11283258 A | 10/1999 |
| JP | 11283264 A | 10/1999 |
| JP | 2000036125 A | 2/2000 |
| JP | 2000195080 A | 7/2000 |
| JP | 2001331956 A | 11/2001 |
| WO | 0016321 A1 | 3/2000 |

* cited by examiner

METHOD AND DEVICE FOR PERFORMING TILT CORRECTION USING MULTI-DIMENSIONAL ACTUATOR

BACKGROUND OF THE INVENTION

1. Field of the Invention

The present invention relates to a tilt control device and method for correcting tilt of a recording surface of an optical disc, such as, for example, a recordable or read-only disk, by using a multi-dimensional actuator, e.g., a 3D actuator.

In recent years, optical disc apparatuses have been developed for recording and reproducing large quantities of data.

Principally, an optical disc should be kept in a flat disc shape when it is set on a disc motor, so that an optical pickup unit can keep its optical axis perpendicular to the recording surface of the disc during recording and reproducing operations. For scanning the recording tracks, the optical pickup unit moves in a radial direction in alignment with the radius of the optical disc.

However, the optical disc set on the disc motor is not flat, mainly due to the manufacturing process. The optical disc curves both in the radial and circumferential directions. Furthermore, all kinds of drive tolerances may be faced. Therefore, the optical pickup unit cannot scan the recording tracks with its optical axis perpendicular to the recording surface of the disc. Furthermore, the angle varies according to the position of the optical pickup unit with respect to the optical disc. The angle formed between the optical axis and the recording surface in a radial direction is defined as the radial tilt angle. Additionally, the angle formed between the optical axis and a line tangential to the recording track (or perpendicular to the radius) of the optical disc is referred to as the tangential tilt. Generally, the amount of radial tilt of the optical disc is within a range of ±10 mrad The user data is extracted from the HF signal. Due to, e.g., time errors in the HF signal, a certain amount of jitter is always present when reading out an optical disc. Some contributors for such a jitter are intersymbol interference, crosstalk between neighboring tracks and disc manufacturing imperfections, but also ordinary noise, present in all electrical circuits. The tilt angle between the disc and the objective lens, is a result of two major contributors, namely, the disc (contribution by manufacturing tolerances and environmental changes) and the drive (contribution by objective lens actuator, turntable motor adjustment, axis adjustment, etc.). The resulting angular deviations lead to comatic aberrations, i.e., a distortion of the optical readout spot on the disc. This distorted readout spot directly results in a distorted HF signal and thus in timing errors, i.e., jitter. Generally, the jitter increases at a greater rate as the radial tilt becomes larger.

Tighter system tolerances in systems like DVD and DVD+RW require decreased maximal allowed tilt errors. These maximal allowed tilt errors are specified in a tilt window which can be, e.g., ±8 mrad in the radial direction. This tilt window is defined to achieve a jitter below a certain required level (typically 15%). If the total tilt in the readout system is larger than this window, the jitter will be too high and active tilt compensation is required. Therefore, in order to reproduce the original signal from the recording track under such fluctuation factors, it is necessary to adjust the optical disc apparatus with respect to the physical fluctuations, such as radial tilt and/or tangential tilt.

2. Description of the Related Art

Japanese Patent Publication No. JP-A-2000-195080 discloses a conventional optical disc apparatus in which a tilt control is applied. In operation, tilt detection means outputs a tilting signal having a voltage corresponding to the tilting amount of the optical disc with respect to an optical head used for recording and reproducing. The tilt control means drives the tilt actuating means or radial tilt adjuster such that a tilt control signal becomes zero. Thus, the optical head can be kept in a position parallel to the optical disc so that a signal with a good quality can be recorded thereto or reproduced therefrom.

Furthermore, International Patent Application No. WO-A-00/16321, corresponding to U.S. Pat. No. 6,157,600, discloses a tilt control device and method, wherein a sledge of an optical pickup unit is placed on a tilting unit which can tilt or incline in the radial direction with respect to the optical disc. In response to a change in the radial tilting angle, the angle of the optical axis of the pickup unit changes with respect to the recording surface of the disc. As a result, the jitter of the signal reproduced also varies.

The tilt sensor may be calibrated on the basis of a jitter measurement in a predetermined calibration data track area. In response to a change in the radial tilting angle, the angle of the optical axis of the pickup unit, with respect to the recording surface of the disc, also changes. As a result, the jitter of the signal reproduced from the calibration data track also changes. The position at which the jitter of the reproduced signal shows its smallest value is the optimum position for the radial tilt. However, a sensor calibration based on the jitter is not possible for non-written optical discs, such as DVD+RW discs.

To reduce costs, the tilt sensor can be omitted. The tilt measurement may then be based on the dz/dr method, wherein the DC components of the radial tilt are measured using the actuator of the optical reading system. In particular, the DC radial tilt is measured through differentiation of the DC actuator voltage, i.e., the mean actuator voltage over one disc revolution, to the radius r, times the DC sensitivity of the actuator. However, this tilt measurement is very sensitive to the focus DC sensitivity and, therefore, has to be calibrated. Such a calibration can easily be performed in drives with a tilting frame. Unfortunately, this calibration is not possible for drives that use a 3D actuator to compensate tilt.

SUMMARY OF THE INVENTION

It is, therefore, an object of the present invention to provide a tilt control device and method by means of which an accurate sensorless tilt measurement can be provided with a 3D actuator.

This object is achieved by a tilt control device for controlling a radial tilt of a recording surface of an optical disc with respect to an optical recording/reproducing beam, said tilt control device comprising control means for generating two focus controlling outputs; and actuating means for controlling a focusing state of the optical recording/reproducing beam based on said two focus controlling outputs and the radial tilt, characterized in that said control means is arranged to determine the radial tilt value based on a differentiation of focus control values obtained at different radii of said optical disk.

Accordingly, the specific multi-dimensional actuator design is used in combination with a dz/dr tilt measurement to provide an improved accuracy for sensorless tilt measurements. The combination of, e.g., a 3D actuator with the dz/dr tilt measurement provides the advantage that focus and tilt adjustment can be performed in the same element. Thereby, influences or measurement variations caused by environmental conditions and/or circuit characteristics can be minimized to reduce compensations requirements.

Preferably, the actuator design is based on a splitting of focus coils. Thereby, the actuator tilt DC sensitivity can be directly related to the focus DC sensitivity, and the sensor sensitivity is cancelled out by the tilt compensator sensitivity. Now, the actuator can be used for feed-forward tilt compensation without offset or gain errors and without any additional sensor, and a very accurate tilt control functionality can be achieved.

BRIEF DESCRIPTION OF THE DRAWINGS

The invention will now be described on the basis of a preferred embodiment with reference to the accompanying drawings, in which.

DESCRIPTION OF THE PREFERRED EMBODIMENTS

The preferred embodiment will now be described on the basis of a tilt control operation in an optical disc player.

Figure 1:
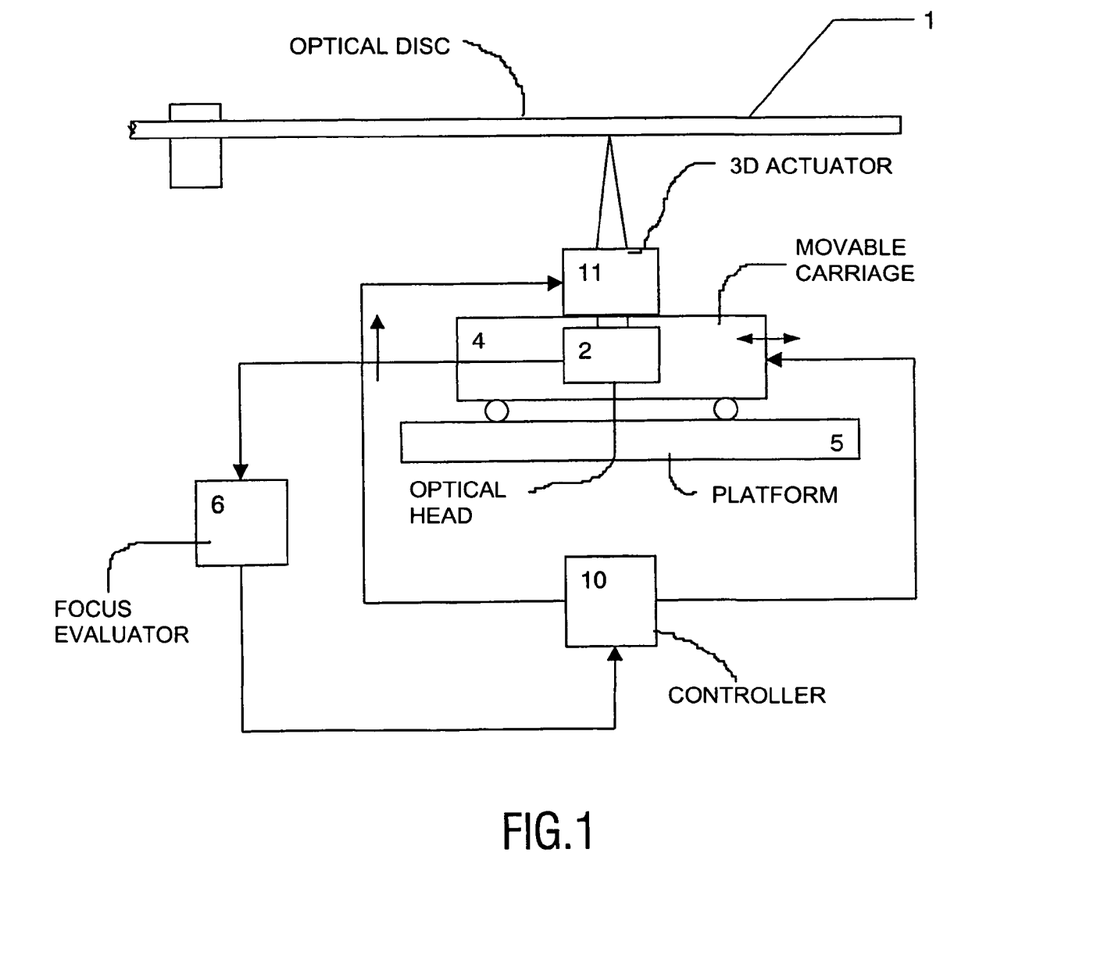
FIG. 1 shows a basic block diagram of a tilt control device according to the preferred embodiment.

In FIG. 1, a tilt control arrangement or device is shown for correcting tilt with respect to an optical disc 1. The tilt control device comprises an optical pickup unit comprising a movable carriage or sledge 4 for moving the optical pickup unit in a radial direction on a platform 5. The optical pickup unit comprises an optical head 2 which directs and receives a radiation beam to/from the optical disc 1 through a 3D actuator 11 arranged to control the focus, tilt and radial position of the 3D actuator by a three-dimensional actuating function based on split focus coils. Each of the split focus coils of the 3D actuator 11 is driven based on an own focus control signal received from a processor 10.

Furthermore, a focus evaluator 6 is provided which produces a focusing error signal based on a beam reflection signal obtained of the optical head 2. According to the preferred embodiment, the mean radial disc tilt is initially measured by means of the mean focus voltages at different radii on the disc 1. To achieve this, the mean radial tilt between two radii is calculated and stored in the controller 10, and the calculated mean tilt is then used to generate or calculate a tilt control output signal used for controlling the 3D actuator during a disc tracking operation.

Figure 2:
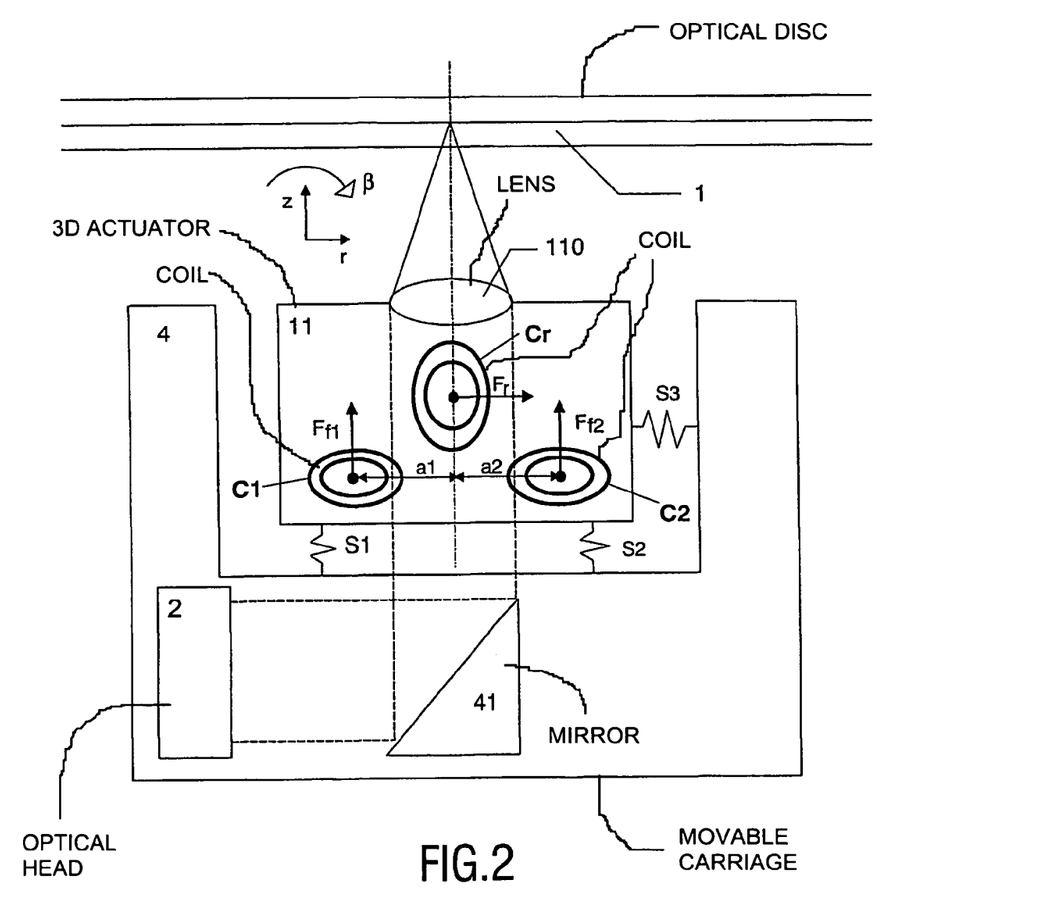
FIG. 2 shows a schematic arrangement of a 3D actuator which can be applied in the preferred embodiment.

FIG. 2 shows a more detailed schematic diagram of the arrangement of the 3D actuator 11. In FIG. 2, the 3D actuator is attached to the sledge 4 by spring arrangements S1 to S3 thereby allowing three-dimensional movement of the 3D actuator 11 with respect to the sledge 4 and the recording surface of the optical disc 1. Thereby, the point at which the radiation beam impinges on the recording surface of the optical disc 1 and the impinging angle of the radiation beam with respect to the recording surface can be controlled. The radiation beam is directed between the optical head 2 and the optical disc 1 via a mirror 41 and an objective lens 110. The optical head 2 comprises a radiation source (not shown), e.g., a laser, for generating the radiation beam, e.g., laser beam, and a detector (not shown) for receiving light reflected from the recording surface of the optical disc 1 and guided back to the optical head 2 via the objective lens 110 and the mirror 41. Based on the reflected light signals detected at the optical head 2, radial and focus tracking error signal may be generated.

Furthermore, the 3D actuator 11 comprises split focus coils C1, C2 for controlling focus and tilt, and a radial coil Cr for controlling the radial position of the 3D actuator 11. The split focus coils are arranged at respective radial distances a1 and a2, respectively, from a central symmetry line of the 3D actuator 11. When a voltage is applied to the coils and the coils are arranged in a magnetic field, each of the split focus coils C1, C2 and the radial coil Cr generates an own force $F_{f1}$, $F_{f2}$ and $F_r$, respectively, depending on the current I flowing through the coil windings. The force generated by each of the coils can be calculated based on the known Lorentz equation:

$$F = kI \ [N/A] \tag{1}$$

Thus, the factor k indicates the amount of force generated due to a current I. Due to the eccentric arrangement of the split focus coils C1 and C2, a tilt β can be generated if $F_{f1} = -F_{f2}$, while a vertical movement (z direction) along the symmetry line perpendicular to the surface of the optical disc 1 can be generated if $F_{f1} = F_{f2}$.

Figure 3:
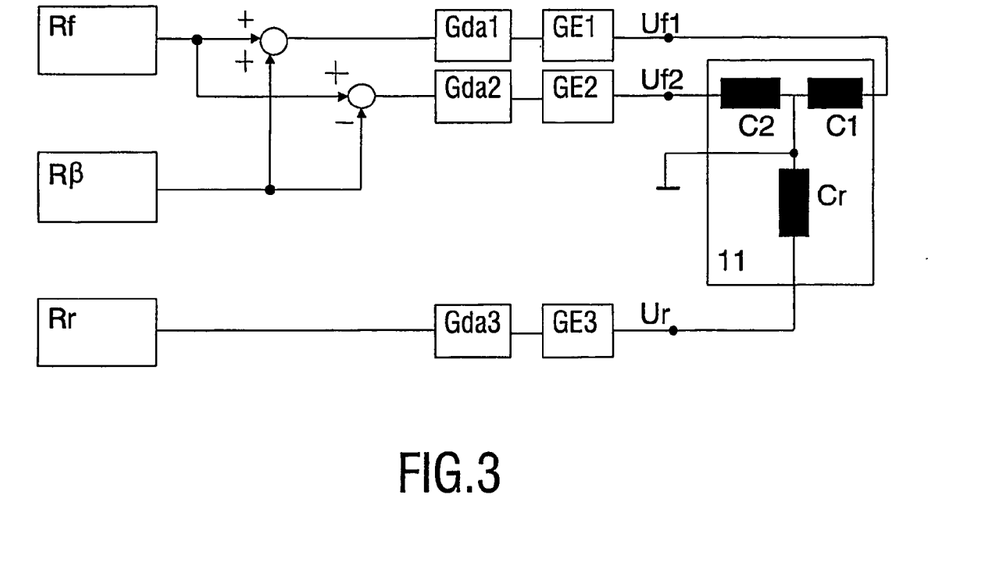
FIG. 3 shows a schematic block diagram indicating control parts for generating voltages applied to the 3D actuator.

FIG. 3 shows a schematic block diagram indicating control parts for generating control voltages Uf1, Uf2 and Ur each applied, e.g., between one end of the respective actuator coil and a ground terminal or other fixed reference voltage, based on control data stored in respective control registers Rf, Rβ and Rr, or any other kind of memory. The control parts may be arranged at the processor 10 or a separate control device provided at the 3D actuator 11.

In particular, focus control data $r_f$ obtained from the focus evaluator 6 and processor 10 (based on, e.g., a PID (Proportional Integral Derivative) controller function), is stored in a focus control register Rf, tilt control data $r_β$ is stored in a tilt control register Rβ and radial control data $r_r$ is stored in a radial control register Rr. The actuator coils C1, C2 and Cr may be arranged in a star connection as indicated in FIG. 3. A radial control voltage Ur for controlling the radial coil Cr is generated by inputting the radial control data $r_r$ into digital/analog converter (DAC) having a gain Gda3 and supplying the converted analog signal to a power amplifier or end stage having a gain GE3. Additionally, focus control voltages Uf1 and Uf2 are generated based on a predetermined combination of the focus control data $r_f$ and the tilt control data $r_β$. Particularly, a first focus control voltage Uf1 is generated by adding the focus control data $r_f$ and the tilt control data $r_β$ and supplying the result via a dedicated DAC having a gain Gda1 to a dedicated power end stage having a gain GE1. Moreover, a second focus control voltage Uf2 is generated by subtracting the tilt control data $r_β$ from the focus control data $r_f$ and supplying the result via a dedicated DAC having a gain Gda2 to a dedicated power end stage having a gain GE2. Thus, the focus, tilt and radial position of the 3D actuator 11 can be controlled by storing control data in the control registers Rf, Rβ and Rr. If the focus control data $r_f$ and the tilt control data $r_β$ is selected such that Uf1=−Uf2, a tilt β is applied to the 3D actuator 11. On the other hand, if the focus control data $r_f$ and the tilt control data $r_β$ is selected such that Uf1=Uf2, a z movement is generated at the 3D actuator 11. The focus control data $r_f$ and the radial control data $r_r$ may be controlled by a conventional PID controller, while the tilt control data $r_β$ may be controlled by a feed-forward algorithm using a tilt table in which mean tilt values are stored.

For the 3D actuator design according to the preferred embodiment, the following feed-forward algorithm can be used which is highly invariant to the focus and tilt DC sensitivity variations, and any end-stage and digital-to-analog conversion gain variations.

Based on focus control values obtained from the focus evaluator 6 at the different radii, the mean radial disc tilt can be calculated using the following equation (2):

$$\beta_{in} = G_{DC:focus} G_{dac} \frac{\Delta r_f}{\Delta R} \quad (2)$$

where $\Delta r_f$ is the difference between two averaged focus control data values measured during initialization, $\Delta R$ is the sledge step in radial direction between two measurements, $G_{dac}$ is the gain of the DAC combined with the power end stage in the feed-forward control path indicated in FIG. 3, and $G_{DC;focus}$ is the focus DC sensitivity (in m/V) of the 3D actuator 11. The measurement result is linear dependent on the generally unknown focus DC sensitivity.

To compensate disc tilt with the 3D actuator 11, the control data $r_\beta$ of the tilt register control register R$\beta$ must be calculated in accordance with the following equation (3):

$$r_\beta = \frac{G_c \beta_d}{G_{DC:tilt} G_{dac}} \quad (3)$$

where $\beta_d$ is the mean disc tilt of the disc 1, $G_C$ is the factor between actuator tilt and disc tilt for which comatic aberrations are optimal corrected, $G_{dac}$ is the gain of the DAC combined with the power end stage of the feed-forward control path, and $G_{DC;tilt}$ is the tilt DC sensitivity (in rad/V) of the 3D actuator 11. The actual resulting actuator tilt is dependent on the generally unknown tilt DC sensitivity.

Substitution of the measured mean disc tilt $\beta_m$ in equation (2) for the actuator disc tilt $\beta_d$ of equation (3), leads to the following equation (4):

$$r_\beta = \frac{G_c G_{DC:focus} \Delta r_f}{G_{DC:tilt} \Delta R} \quad (4)$$

If both DC sensitivities (focus and tilt) are known, the 3D actuator 11 can be controlled accurately in tilt direction based on the measured mean focus control data ($\Delta r_f$) and sledge step ($\Delta R$).

In general, both DC sensitivities are dependent on the magnetic field and the coil resistance of the actuator coils. Both quantities fluctuate from batch to batch and as a function of temperature, and, therefore, introduce a lot of errors preventing the use of feed-forward open-loop control with a 3D actuator. However, if an actuator is used where tilt actuating is performed by means of splitting the focus coils, as in the 3D actuator 11, it can be shown that both effects strongly cancel each other. For the 3D actuator 11 shown in FIG. 2, the focus and tilt DC sensitivities can be expressed as follows:

$$G_{DC:focus} = \frac{k_f}{c_f R_f} \quad (5)$$

and $$G_{DC:tilt} = \frac{k_f(a_1 + a_2)}{c_t R_f} \quad (6)$$

where $k_f$ denotes the k-factor of the split focus coils C1 and C2, $R_f$ denotes the ohmic resistance of the split focus coils C1 and C2, $c_f$ denotes the spring constant of the springs S1 and S2 with respect to a z-movement of the 3D actuator 11, and $c_t$ denotes the spring constant of the springs S1 and S2 with respect to a tilt movement of the 3D actuator 11.

Substitution of these sensitivities in the expression for the tilt register value $r_\beta$ leads to $$r_\beta = \frac{G_c c_t \Delta r_f}{c_f (a_1 + a_2) \Delta R} \quad (7)$$

which is completely independent of the coil resistance Rf and actuator focus k-factor (magnetic field) and, therefore, independent of temperature and batch variations. Geometrical deviations, such as ($a_1+a_2$), are considered to be limited and only deviations between focus stiffness and torsion stiffness influence the gain errors.

It is noted that no offset error is present in this tilt control scheme.

Even for actuators with strongly varying focus k-factors as a function of the vertical z-position (focus), the measurement error and the compensation error cancel each other. For example, at a nominal position of z=+0.6 mm the focus k-factor may have dropped by a factor two. Thus, a factor two, higher coil voltages are required to focus the actuator leading to a measured disc tilt $\beta_m$ of two times the result in the z=0 position. Accordingly, the tilt actuator set point equals twice the set point obtained at the z=0 position. However, due to the fact that the tilt DC sensitivity has also dropped by a factor two at z=+0.6 mm, the actuator is controlled to the required disc tilt $\beta_d$.

In the following, the tilt control procedure according to the preferred embodiment is described with reference to FIGS. 4 to 6.

Figure 4:
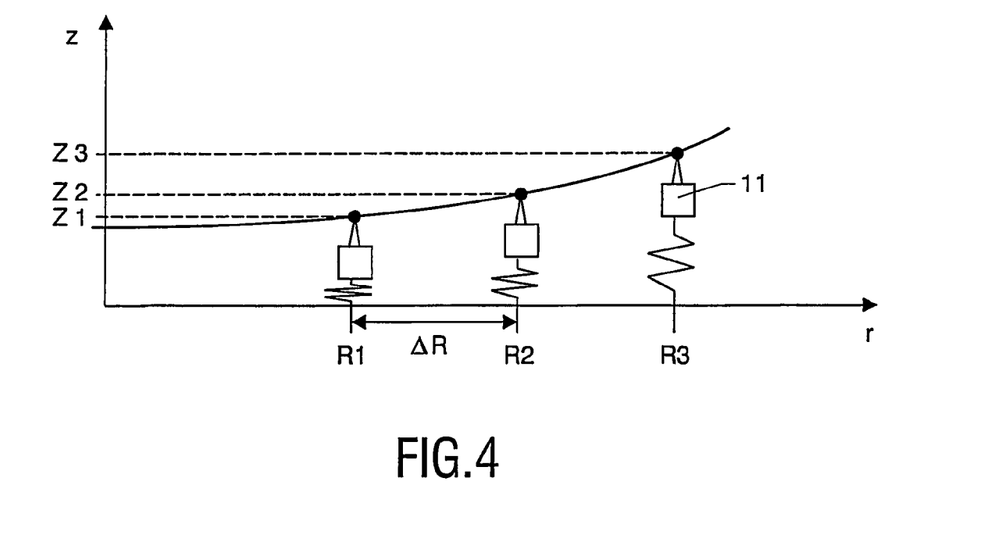
FIG. 4 shows a diagram indicating different radial positions and corresponding different focus positions measured during initialization to determine mean radial tilt.

FIG. 4 shows a diagram schematically indicating different focus positions z1 to z3 of the 3D actuator 11 at corresponding radial positions R1 to R3 on a tilted recording surface of the optical disc 1. During initialization, in a first step S200 of FIG. 6, the mean focus values are obtained from the controller function (e.g., PID output) of the processor 10 at a plurality of different radii (e.g., R1 to R3) of the optical disc 1. Then, based on equation (2), a mean radial disc tilt value $\beta_{mi}$ is derived in step S201 between two radial positions $R_i$ from the focus control data $r_\beta$, e.g., mean focus values obtained from the controller function of the processor 10, wherein $\Delta r_f$ corresponds to the difference in the focus control values between two radial positions $R_i$ and $R_{i+1}$. Then, in step S202, the obtained mean radial tilt values $\beta_{mi}$ are then stored, e.g., in a tilt table which may be arranged as follows:

| radial positions | mean disc tilt values |
|---|---|
| (R1 + R2)/2 | βm1 |
| (R2 + R3)/2 | βm2 |

Figure 5:
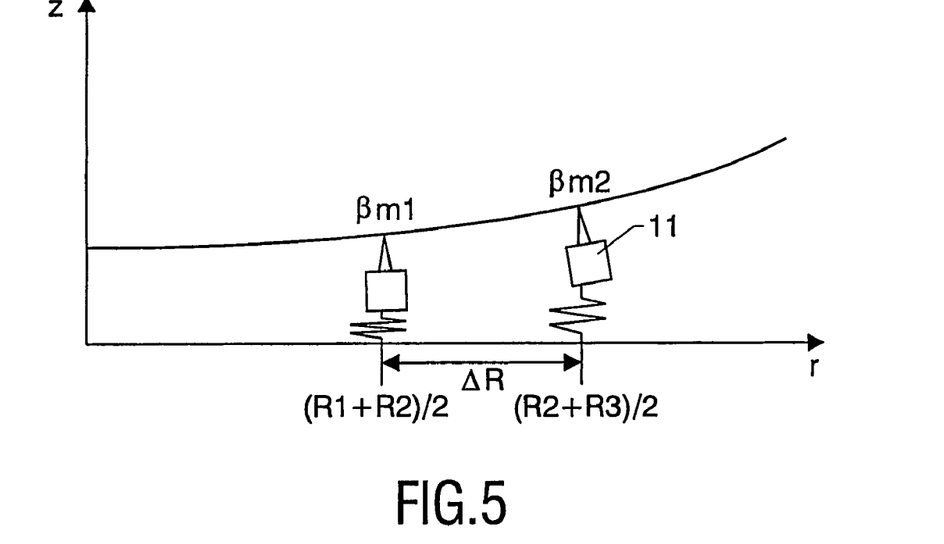
FIG. 5 shows a diagram indicating different radial positions and corresponding mean tilt values applied during a tracking operation.
Figure 6:
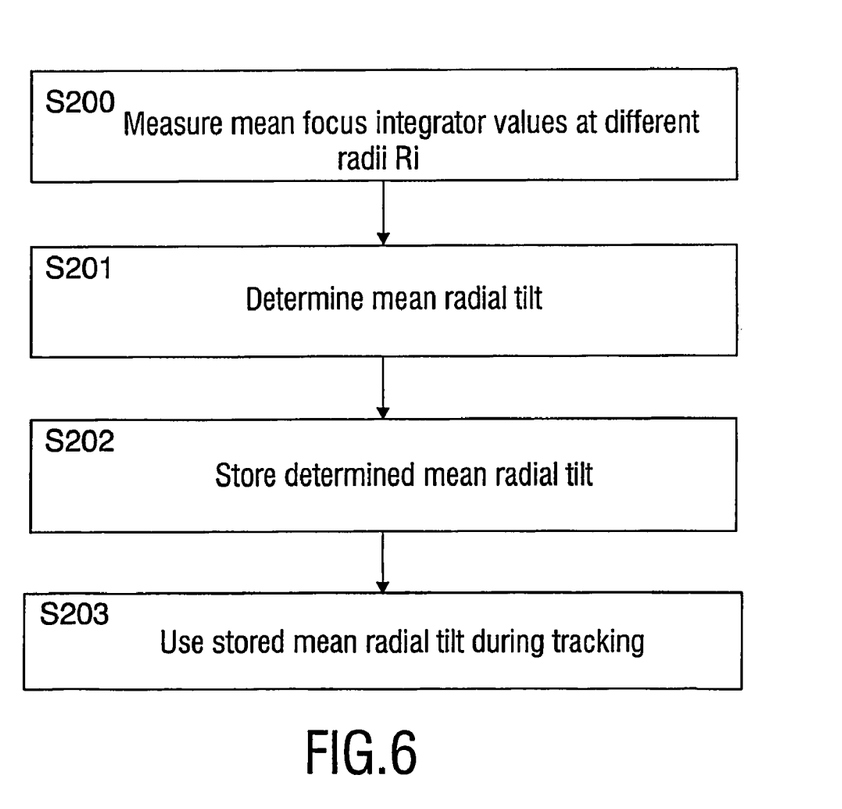
FIG. 6 indicates a flow diagram of a tilt control method according to the preferred embodiment.

As indicated in FIG. 5, the stored mean tilt values $\beta_{mi}$ are then applied during a subsequent tracking (read or write) operation to control the tilt angle of the 3D actuator 11 (step S203 in FIG. 6). To achieve this, tilt control data $r_\beta$ corresponding to the stored mean tilt value may be obtained based on one of the equations (3), (4) and (7). Interpolation can be used for positions between selected radii.

As an alternative, the tilt control data $r_\beta$, may be directly stored in the tilt table. Thus, angular deviations between the objective lens 110 and the recording surface of the optical disc 1 can be removed substantially. It is noted that measurements have to be performed at least at two radii $R_i$. After initial measurement of the radial disc geometry and start-up, the disc geometry should remain constant, e.g., in the order of 0.1 mm and 1 mrad, over a time span required to write or read one entire disc.

The combination of the above described dz/dr tilt measurement and feed-forward tilt steering with the 3D actuator 11 provides a promising solution to the problem of accuracy in sensorless tilt measurements with 3D actuators.

The present invention is applicable for any type of disc, including all types of recordable discs. Thus, various modifications may become apparent to those skilled in the art, without departing from the scope of the invention, as defined in the claims. The invention is applicable to any optical recording and reproducing device having any kind of multi-dimensional actuator with a split coil arrangement arranged to control focus and tilt. Thus, even a two-dimensional type of actuator allowing control only in the radial plane may be used for the present invention.

The invention claimed is:

1. A tilt control device for controlling a radial tilt of a recording surface of an optical disc with respect to an optical recording/reproducing beam, said tilt control device comprising:
   control means for generating two focus controlling outputs; and
   actuating means for receiving said two focus controlling outputs for controlling a focusing state and the radial tilt of the optical recording/reproducing beam utilizing said received two focus controlling outputs, wherein said control means determines a radial tilt value based on a differentiation of focus control values obtained at different radii of said optical disk; and
   wherein said control means calculates a mean disc tilt value in a tilt register.

2. The device as claimed in claim 1, wherein said actuating means comprises a split focus coil arrangement for providing focus and tilt adjustment, and said control means supplies said two focus controlling outputs to respective coils of said split focus coil arrangement.

3. The device as claimed in claim 1, wherein said focus controlling outputs are Proportional Integral Derivative (PID) controller outputs.

4. The device as claimed in claim 1, wherein said control means positions a sledge at least two different radial positions, controls said actuating means to adjust the focus, and measures said focus control values at said at least two different radial positions.

5. The device as claimed in claim 1, wherein said control means generates said focus controlling outputs based on measured mean focus control values and corresponding radial steps between two measurements.

6. A tilt control device for controlling a radial tilt of a recording surface of an optical disc with respect to an optical recording/reproducing beam, said tilt control device comprising:
   control means for generating two focus controlling outputs; and
   actuating means for controlling a focusing state and the radial tilt of the optical recording/reproducing beam based on said two focus controlling outputs, wherein said control means determines a radial tilt value based on a differentiation of focus control values obtained at different radii of said optical disk, wherein said control means calculates a mean disc tilt value said mean disc tilt value is obtained based on the following equation:

$$r_\beta = \frac{G_c c_t \Delta r_f}{c_f (a_1 + a_2) \Delta R}$$

where $\Delta r_f$ is the difference between two averaged focus control values measured at initialization, $\Delta R$ is a sledge step in radial direction between two measurements, $G_C$ is the factor between actuator tilt and disc tilt for which comatic aberrations are optimal corrected, $c_f$ is a spring constant acting against a focusing movement, $c_t$ is a spring constant acting against a tilt movement, $a_1$ is a distance of a first coil of said split coil arrangement with respect to a symmetry line, and $a_2$ is a distance of a second coil of said split coil arrangement with respect to said symmetry line.

7. The device as claimed in claim 1, wherein said device further comprises a tilt table for storing an information indicating mean disc tilt values and corresponding radial positions.

8. An optical disc player comprising a tilt control device as claimed in claim 1.

9. A tilt control device for controlling a radial tilt of a recording surface of an optical disc with respect to an optical recording/reproducing beam, said tilt control device comprising:
   a processor configured to generate two focus control outputs; and
   an actuator configured to:
   receive said two focus control outputs; and control a focusing state and the radial tilt of the optical recording/reproducing beam utilizing said received two focus control outputs, wherein said processor determines a radial tilt value based on a differentiation of focus control values obtained at different radii of said optical disk; and
   wherein said processor calculates a mean disc tilt value in a tilt register.

10. The device as claimed in claim 9, wherein said actuator comprises a split focus coil arrangement for providing focus and tilt adjustment, and said processor supplies said two focus control outputs to respective coils of said split focus coil arrangement.

11. The device as claimed in claim 9, wherein said mean disc tilt value is obtained based on the following equation:

$$r_\beta = \frac{G_c c_t \Delta r_f}{c_f(a_1 + a_2)\Delta R}$$

where $\Delta r_f$ is the difference between two averaged focus control values measured at initialization, $\Delta R$ is a sledge step in radial direction between two measurements, $G_C$ is the factor between actuator tilt and disc tilt for which comatic aberrations are optimal corrected, $c_f$ is a spring constant acting against a focusing movement, $c_t$ is a spring constant acting against a tilt movement, $a_1$ is a distance of a first coil of said split coil arrangement with respect to a symmetry line, and $a_2$ is a distance of a second coil of said split coil arrangement with respect to said symmetry line.

12. The device as claimed in claim 9, wherein said device further comprises a tilt table for storing an information indicating mean disc tilt values and corresponding radial positions.

13. The device as claimed in claim 9, wherein said processor generates said focus control outputs based on measured mean focus control values and corresponding radial steps between two measurements.

* * * * *